US012634370B2

(12) United States Patent
Dummi Kubendrappa et al.

(10) Patent No.: US 12,634,370 B2
(45) Date of Patent: May 19, 2026

(54) NATIVE EDGE MANAGEMENT PROTOCOL FOR EDGE DEVICES ON LAYER 2 COMMUNICATION

(71) Applicant: Dell Products L.P., Round Rock, TX (US)

(72) Inventors: Veerabhadra Swamy Dummi Kubendrappa, Bangalore (IN); Ajith George, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 132 days.

(21) Appl. No.: 18/897,116

(22) Filed: Sep. 26, 2024

(65) Prior Publication Data

US 2026/0089220 A1 Mar. 26, 2026

(51) Int. Cl.
| | |
|---|---|
| *G06F 15/16* | (2006.01) |
| *H04L 67/145* | (2022.01) |
| *H04L 67/146* | (2022.01) |
| *H04L 67/147* | (2022.01) |

(52) U.S. Cl.
CPC .......... *H04L 67/146* (2013.01); *H04L 67/145* (2013.01); *H04L 67/147* (2013.01)

(58) Field of Classification Search
CPC ................. H04L 67/145; H04L 67/146; H04L 67/147; H04L 12/66; H04W 48/18
See application file for complete search history.

(56) References Cited

U.S. PATENT DOCUMENTS

2010/0061226 A1* 3/2010 Morishige ............... H04L 12/66
                                                              370/216
2020/0296045 A1* 9/2020 Sabella ................... H04W 4/24
2025/0193737 A1* 6/2025 Krishan ................ H04W 48/18

* cited by examiner

*Primary Examiner* — Yves Dalencourt
(74) *Attorney, Agent, or Firm* — Chamberlain, Hrdlicka, White, Williams & Aughtry; Aly Z. Dossa

(57) ABSTRACT
A system for session management between a client device and an edge device includes issuing, by the client device and via a native edge management protocol (NEMP) protocol data unit (PDU), a session create request to an edge device, the NEMP PDU being a portion of a L2 data packet, and the session create request including a session identifier, obtaining, via the NEMP, a session create response from the edge device. The session create response includes the session identifier, a state of the edge device, and software information. The method further includes executing a session, via the NEMP, using the session identifier, the state of the edge device, and the software information, and performing, after the executing and via the NEMP, a session end.

20 Claims, 8 Drawing Sheets

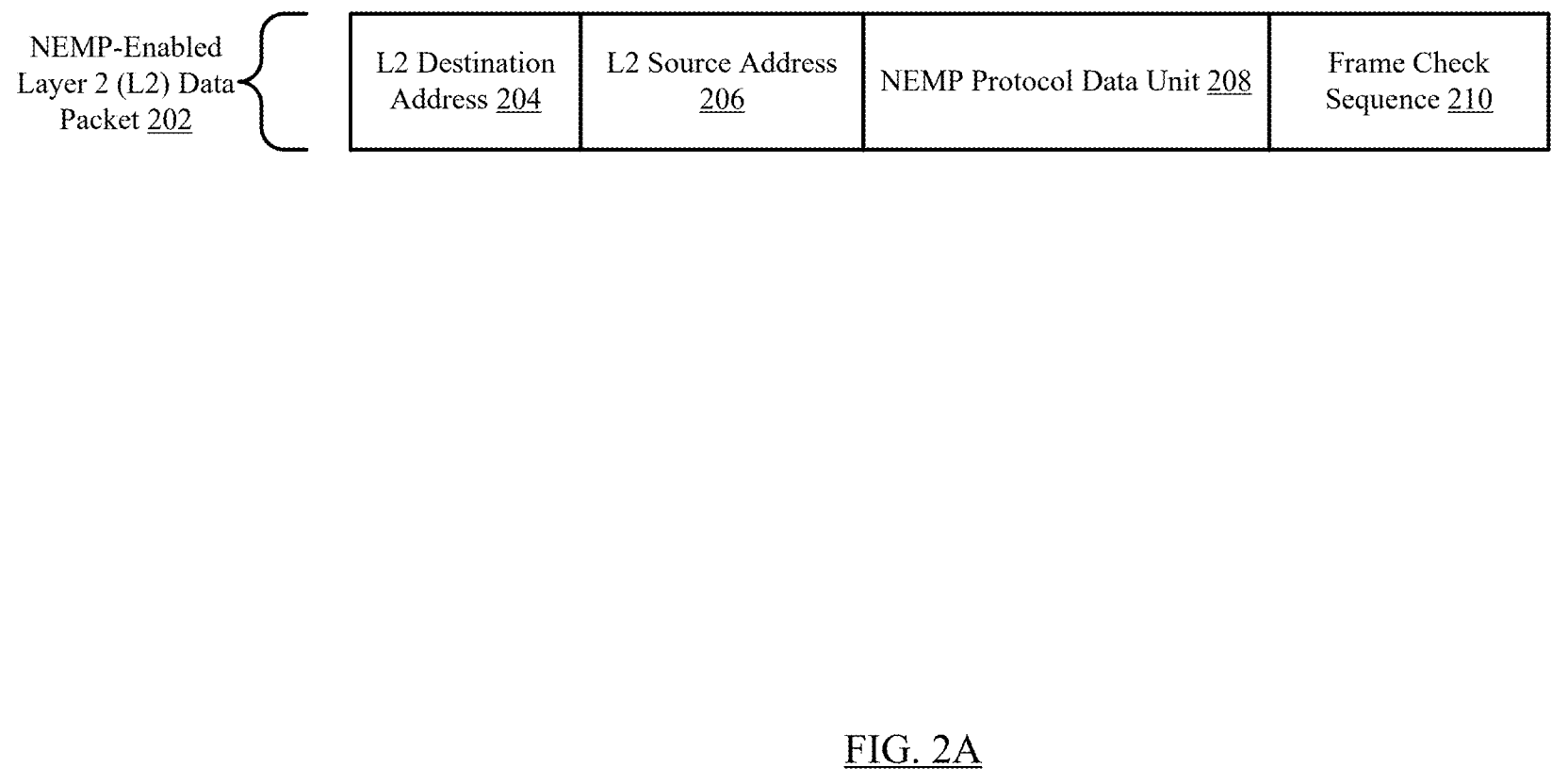

| L2 Destination Address 204 | L2 Source Address 206 | NEMP Protocol Data Unit 208 | Frame Check Sequence 210 |

NEMP-Enabled Layer 2 (L2) Data Packet 202

FIG. 2A

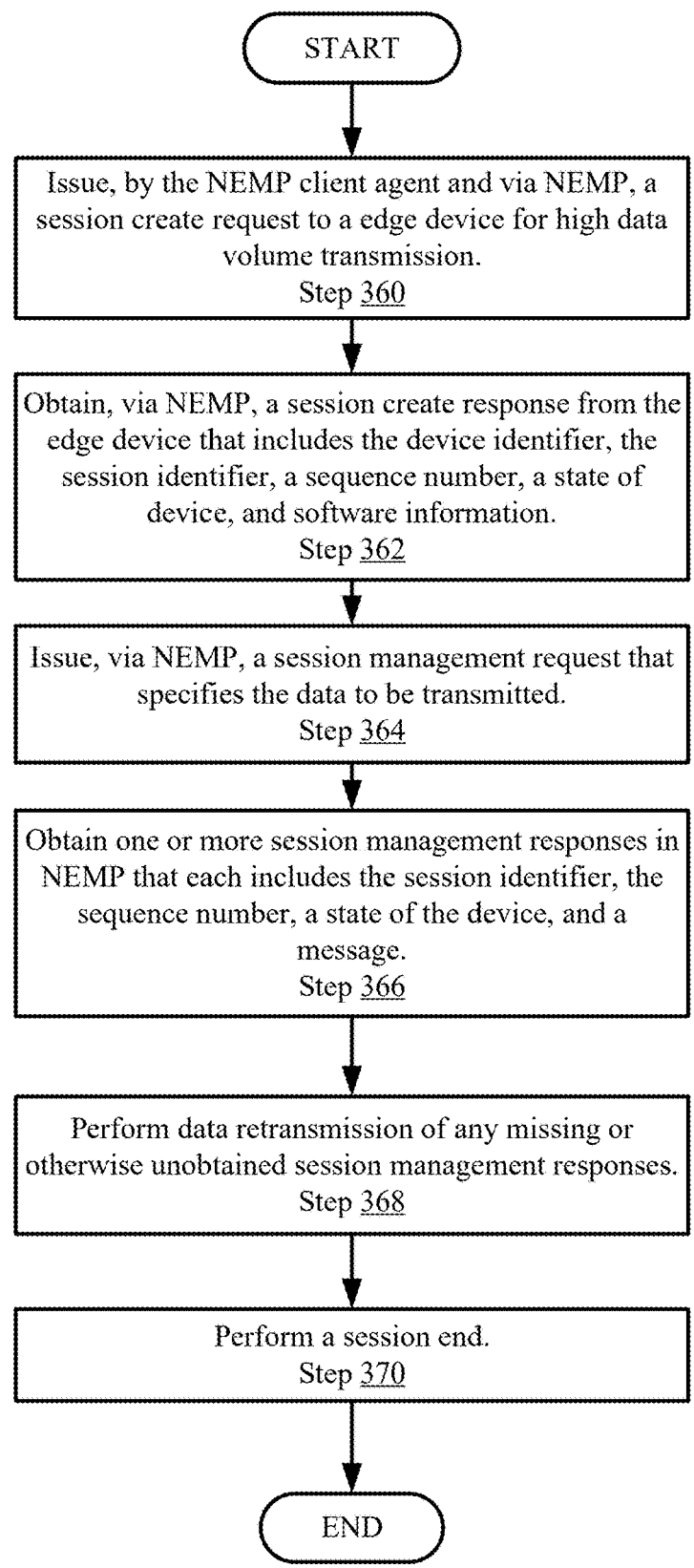

START

Issue, by the NEMP client agent and via NEMP, a session create request to a edge device for high data volume transmission.
Step 360

Obtain, via NEMP, a session create response from the edge device that includes the device identifier, the session identifier, a sequence number, a state of device, and software information.
Step 362

Issue, via NEMP, a session management request that specifies the data to be transmitted.
Step 364

Obtain one or more session management responses in NEMP that each includes the session identifier, the sequence number, a state of the device, and a message.
Step 366

Perform data retransmission of any missing or otherwise unobtained session management responses.
Step 368

Perform a session end.
Step 370

END

NATIVE EDGE MANAGEMENT PROTOCOL FOR EDGE DEVICES ON LAYER 2 COMMUNICATION

BACKGROUND

During secure provisioning of computing devices by service consoles, there is a potential for things to go wrong, requiring manual intervention. Often this results in a lack of network configuration, and at the far edge, devices may not be easily accessible. Service consoles currently do not utilize layer 2 communication for session management of computing devices such as devices on the far edge.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2A shows a diagram of a layer 2 (L2) data packet in accordance with one or more embodiments of the invention.

FIG. 3D shows a flowchart for session management for an edge device performing high volume data transfer in accordance with one or more embodiments of the invention.

DETAILED DESCRIPTION

Figure 1:
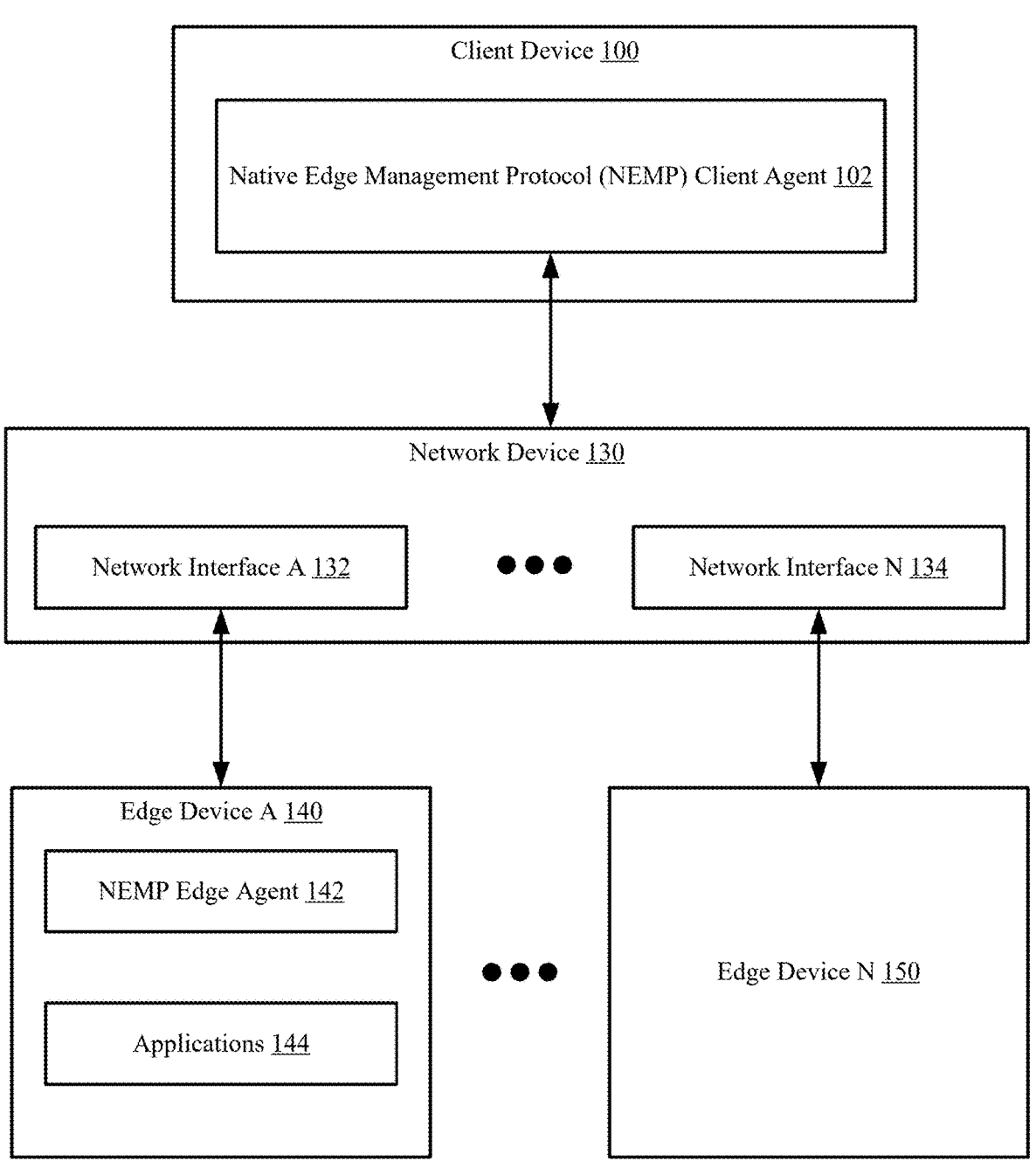
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details, and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this disclosure, elements of figures may be labeled as A to N, A to P, A to M, or A to L. As used herein, the aforementioned labeling means that the element may include any number of items, and does not require that the element include the same number of elements as any other item labeled as A to N, A to P, A to M, or A to L. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, operably connected, or operative connection, means that there exists between elements, components, and/or devices a direct or indirect connection that allows the elements to interact with one another in some way. For example, the phrase 'operably connected' may refer to any direct (e.g., wired directly between two devices or components) or indirect (e.g., wired and/or wireless connections between any number of devices or components connecting the operably connected devices) connection. Thus, any path through which information may travel may be considered an operable connection.

In general, embodiments disclosed herein include a solution for a novel native edge management protocol (NEMP). In one or more embodiments, the NEMP described herein may be implemented as a layer 2 protocol. In such embodiments, layer 3 communication such as internet protocol (IP) network pre-configuration is not required for using NEMP. NEMP is designed to support session management, data integrity, high volume data transmission support and other use cases without departing from the invention. NEMP may be used as layer 2 communication between two devices. A client device may be a device which will be used to troubleshoot other devices on the edge (also referred to as edge devices). In subsequent descriptions, the client device may serve as a service console for troubleshooting and/or other types of session management with an edge device.

Various embodiments of the invention are described below.

FIG. 1 shows an example system in accordance with one or more embodiments of the invention. The system includes a client device (100), any number of edge devices (140, 150), and a network device (130) that enables communication between the client device (100) and the edge devices (140, 150). The components in the system may be operably connected via any combination of wired and/or wireless connections. The system may include additional, fewer, and/or different components without departing from the invention. Each component in the system is operably connected via any combination of wired and/or wireless connections.

In one or more embodiments disclosed herein, the client device (100) provides services to users operating the client device (100). The services may be provided using applications (144) executing on the edge devices (140, 150) operatively connected to the client device (100). The applications (144) may be logical entities executed using computing resources (not shown) of the edge devices (140, 150). Each of the applications (144) may be performing similar or different processes. In one or more embodiments disclosed herein, the applications (144) provide services to the client devices. For example, the applications may host components. The components may be, for example, instances of databases, email servers, operating systems, and/or other components. The applications may host other types of components without departing from the invention. An application may execute on one or more edge devices (e.g., 140, 150) as instances of the application. The applications (144) may utilize data stored in memory. The client devices (100) may access such data using a connection to the edge devices (140, 150) via the network device (130).

In one or more embodiments, the client device (100) further includes functionality for performing session management with the edge devices (140, 150) using a native edge management protocol (NEMP). The client device (100) may perform the session management in accordance with the method of FIGS. 3A-3D. The communication with the edge devices (140, 150) via NEMP in L2 may be performed using a NEMP client agent (102) that is enabled to generate and transmit data packets in accordance with the NEMP to communicate with a NEMP edge agent (142) of the corresponding edge device (140). An example data packet in L2 used for the communication is illustrated in FIG. 2A.

Figure 4:
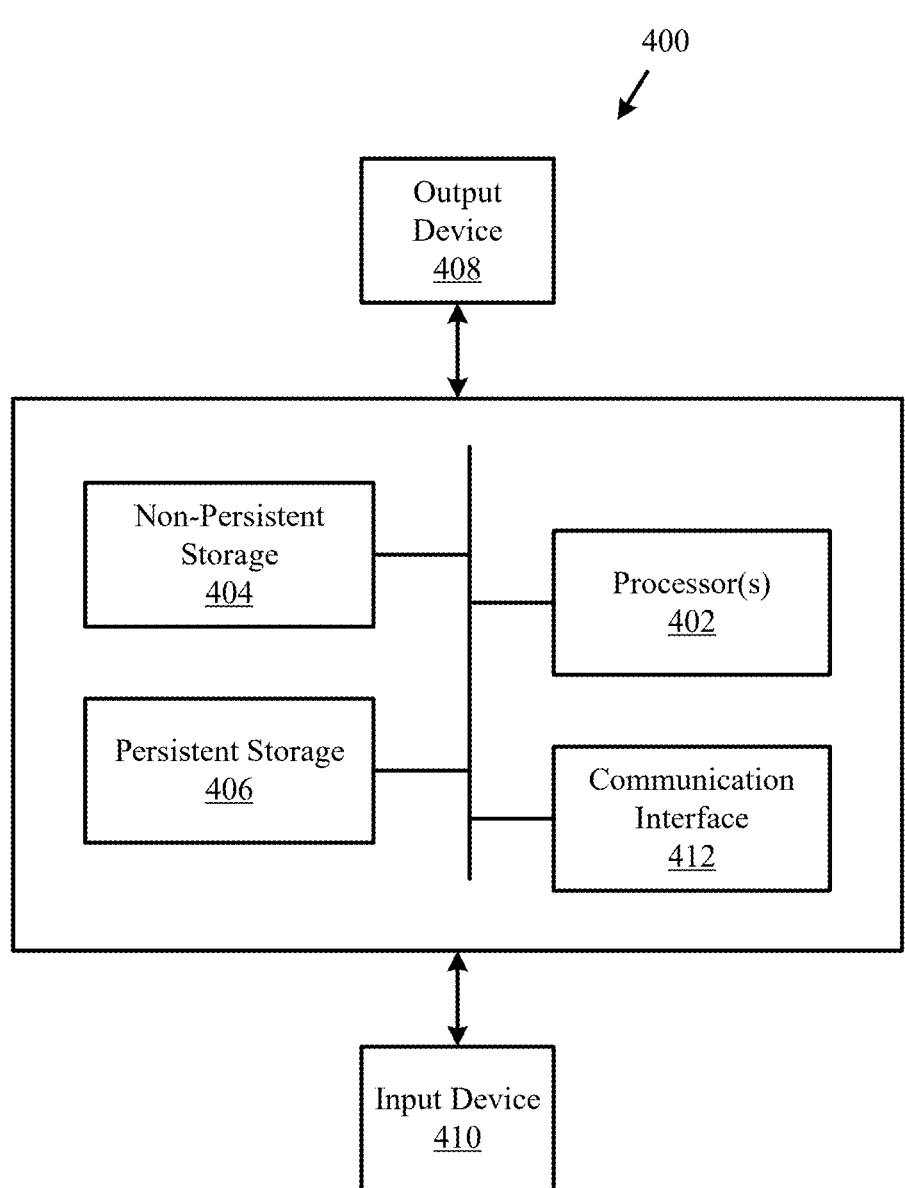
FIG. 4 shows a diagram of a computing device in accordance with one or more embodiments of the invention.

In one or more embodiments, the client device (100) is implemented as a computing device (see e.g., FIG. 4). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client device (100) described throughout this application.

In one or more embodiments disclosed herein, the client device (100) is implemented as a logical device. The logical device may utilize the computing resources of any number of computing devices and thereby provide the functionality of the client device (100) described throughout this application.

In one or more embodiments disclosed herein, the network device (130) includes operative connections to the client device (100) and one or more of the edge devices (140, 150). In one or more embodiments, the network device (130) includes functionality for providing communication between the edge devices (140, 150) and the client device (100). The network device (130) may utilize network interfaces (132, 134) to provide such communication. The network interface (132, 134) may be implemented using any suitable interconnection technology including, for example, system buses such as compute express links or other interconnection protocols. The networking interface may support any input/output (IO) protocol, any memory protocol, any coherence interface, etc. The network interfaces (132, 134) may support processor-to-device connections, processor-to-memory connections, and/or other types of connections. The network interfaces (132, 134) may be implemented using one or more hardware devices including circuitry (such as Ethernet ports) adapted to provide the functionality of the network interfaces (132, 134) described herein.

While the system illustrated in FIG. 1 illustrates communication between the client device (100) and the edge devices (140, 150) using a network device (130), the communication may be performed via a more direct connection between the client device (100) and any of the edge devices (140, 150).

In one or more embodiments disclosed herein, the network device (130) is implemented as a computing device (see e.g., FIG. 4). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the network device (130) described throughout this application.

In one or more embodiments disclosed herein, the network device (130) is implemented as a logical device. The logical device may utilize the computing resources of any number of computing devices and thereby provide the functionality of the network device (130) described throughout this application.

In one or more embodiments disclosed herein, an edge device (140, 150) is used for providing computing resources for services provided by the applications (144) as discussed herein. In one or more embodiments, the edge devices (140, 150) may be located proximately close to real-world processes. For example, the edge devices (140, 150) may be operatively connected to data sources (such as sensors, cameras, measurement instruments, etc.) not shown in FIG. 1. The data sources may generate data to be processed by the applications (144) and consumed, for example, by the client device (100).

In one or more embodiments disclosed herein, each of the edge devices (140, 150) is implemented as a computing device (see e.g., FIG. 4). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the edge devices (140, 150) described throughout this application.

In one or more embodiments disclosed herein, one or more of the edge devices (140, 150) is implemented as a logical device. The logical device may utilize the computing resources of any number of computing devices and thereby provide the functionality of the storage devices (132, 134) described throughout this application.

While the system of FIG. 1 has been illustrated and described as including a limited number of specific components, a system in accordance with embodiments of the invention may include additional, fewer, and/or different components without departing from the invention.

FIG. 2A shows a diagram of a NEMP-enabled L2 data packet in accordance with one or more embodiments of the invention. The NEMP-enabled L2 data packet (202) (also referred to as a L2 data packet or a data packet) is a data structure that includes a L2 destination address (204), a L2 source address (206), a NEMP protocol data unit (PDU) (208), and a frame check sequence (210). The L2 data packet

5

(202) may include additional, fewer, and/or different components without departing from the invention.

In one or more embodiments, the L2 destination address (204) is a network address (e.g., a MAC address) for a computing device receiving the data packet (202). The L2 source address (206) may be a network address (e.g., a MAC address) for a computing device issuing the data packet (202).

The NEMP PDU (208) includes data for NEMP communication between the client device (100, FIG. 1) and one or more of the edge devices (140, 150, FIG. 1). The NEMP PDU (208) may be formatted in accordance with the NEMP. For additional details regarding the NEMP PDU, see e.g., FIG. 2B.

Figure 2B:
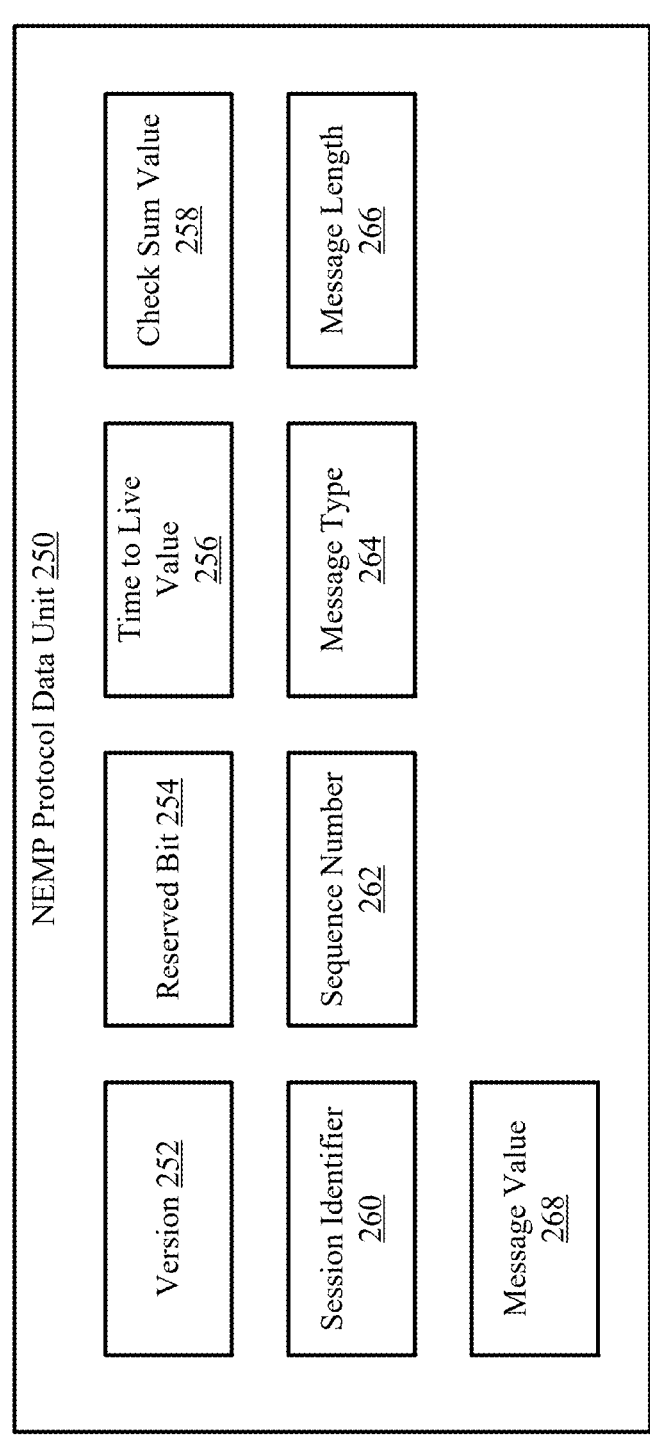
FIG. 2B shows a diagram of a native edge management protocol (NEMP) protocol data unit (PDU) in accordance with one or more embodiments of the invention.

Turning to FIG. 2B, the NEMP PDU (250) is an embodiment of a NEMP PDU (208, FIG. 2A) discussed above. The NEMP PDU (250) includes a version value (252), a reserved value (254), a time to live value (256), a check sum value (258), a session identifier (260), a sequence number (262), a message type (264), a message length (266), and a message value (268). The NEMP PDU (250) may include additional, fewer, and/or different components without departing from the invention.

In one or more embodiments, the version (252) describes the version of NEMP that is being used for communication for the NEMP PDU (250). The version (252) may be used in maintaining and updating the protocol with future use cases. An example size of the version (252) is three bits.

The reserved value (254) may be a value reserved for other NEMP definitions. An example size of the reserved value (254) is one bit.

The time to live (TTL) value (256) is a value that represents a length of time for activity for the NEMP PDU (250). Time to live may be used by source device to inform the validity of a message. An example TTL value (256) may be represented using a TTL type (e.g., seconds, minutes, hours, days), and a numerical value. An example size of the type is two bits (e.g., "00" represents the seconds type, "01" represents the minutes type, etc.), and an example size of the numerical value is six bits.

The session identifier (260) is a value that represents a unique session associated with a connection between a client device (100, FIG. 1) and one of the edge devices (140, 150) at a given point in time. If a session between the client device and the edge device includes issuing and receiving multiple NEMP PDUs, each corresponding NEMP PDU may specify the same session identifier (260). For a session in which device discovery (discussed in FIG. 3A) is performed, a base value (e.g., a numerical value of "0") may be used for the session identifier (260). As an example, a session identifier (260) with a size of 7 bits indicates enabling the client device to communicate with $2^7$ (or 128) edge devices at a time.

The check sum value (258) is a value used for the verification of the data integrity of the NEMP PDU (250). Any mechanism for verifying the data integrity may be used in tandem with the check sum value (258) without departing from the invention.

The sequence number (262) is a numerical value used for mapping a request (e.g., a session create request or a session management request, discussed below in FIGS. 3A-3D) and a response (e.g., a session create response or a session management response, discussed below in FIGS. 3A-3D). In this manner, a request generates a sequence number (262), and a corresponding response may include the same sequence number (262).

The message of a NEMP PDU (250) may be represented in a type, length, value (TLV) format. The TLV format may be an encoding/decoding mechanism for encapsulating messages. A message in the TLV format may include a message type (264), a message length (266), and a message value (268). The message type (264) may map a value to a type of message included in the NEMP PDU (250). As an example, for a message type (264) of a size of five bits, the message type (264) may represent one of up to $2^5$ (or 32) types of messages. Examples of types of messages include, but are not limited to, a session creation request, a session creation response, a session management request for troubleshooting an edge device, a session management request for a heartbeat monitoring, a session management request for high volume data transmission, a session management response, multipart last packet, a multipart sequence number, a multipart retransmission list, an end marker, a request to get management network info, a message for setting management network info, a ping operation, export logs, a reboot request, a device identifier message, operating system (OS) details, and an end session request. The message length (266) is a value that represents a length of the corresponding message, and the message value (268) is a value that represents the contents of the message.

Figure 3A:
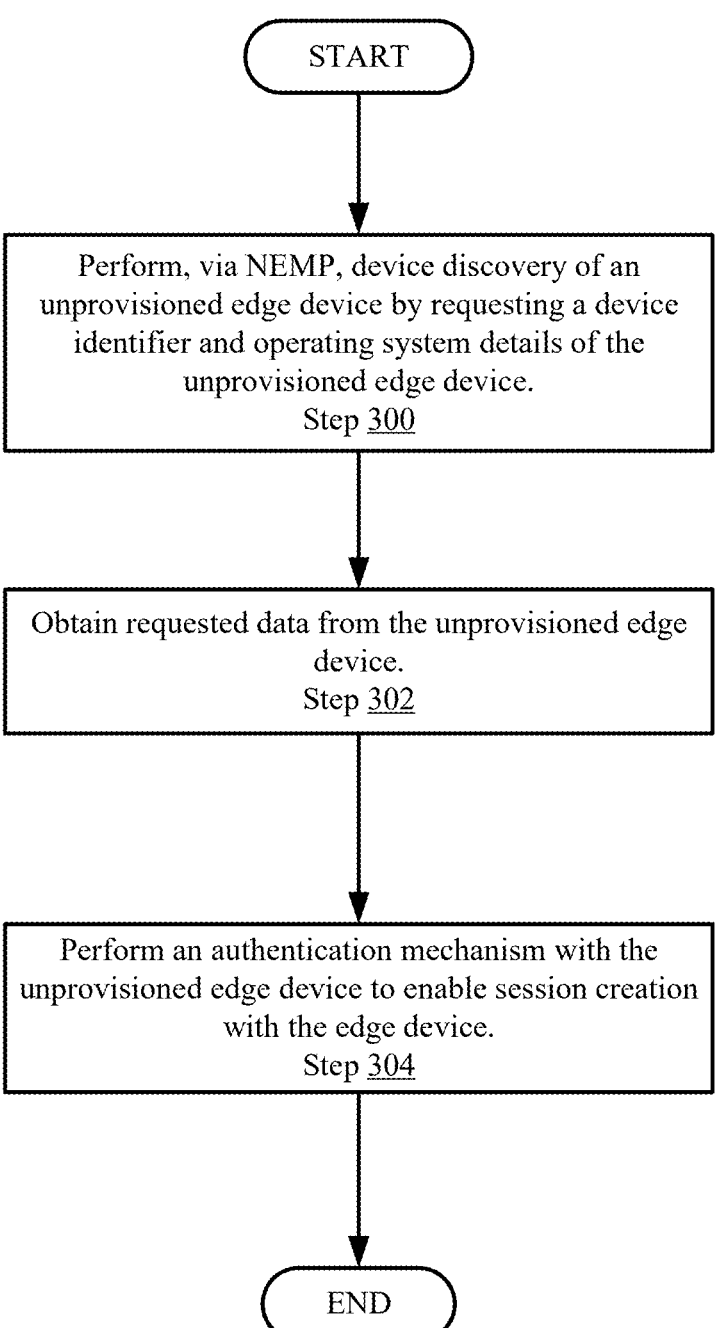
FIG. 3A shows a flowchart for provisioning an edge device using NEMP in accordance with one or more embodiments of the invention.

FIG. 3A shows a flowchart for provisioning an edge device using NEMP in accordance with one or more embodiments of the invention. The method shown in FIG. 3A may be performed by, for example, a client device (100). Other components of the system illustrated in FIG. 1 may perform the method of FIG. 3A without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

Turning to the method, in step 300 (FIG. 3A), device discovery is performed on an unprovisioned edge device. In one or more embodiments, the device discovery includes issuing a request for information from the edge device that is not provisioned. AN unprovisioned edge device is an edge device that is not assigned to a layer 3 (e.g., IP) address. The requested information from the device may include, for example, a device identifier such as a device service tag or a serial number, and OS details of the edge device. Other information may be requested without departing from the invention. The request may be associated with a sequence number.

In step 302, the requested data is obtained from the unprovisioned edge device. In one or embodiments, the requested data is obtained using a response to the request for device discovery. The response may include, for example, the corresponding sequence number, the device service tag of the edge device, and the requested OS details.

In step 304, an authentication mechanism is performed with the unprovisioned edge device. Any authentication mechanism may be performed using the requested data (and any other information of the edge device) without departing from the invention. Further, any additional communication in the NEMP may be performed for the authentication mechanism. Following authentication of the edge device via the authentication mechanism, the edge device is enabled to initiate sessions with the edge device. Conversely, following the authentication, the edge device may be enabled to initiate sessions with the client device. Examples of initiated sessions are described in FIGS. 3B-3D.

Figure 3B:
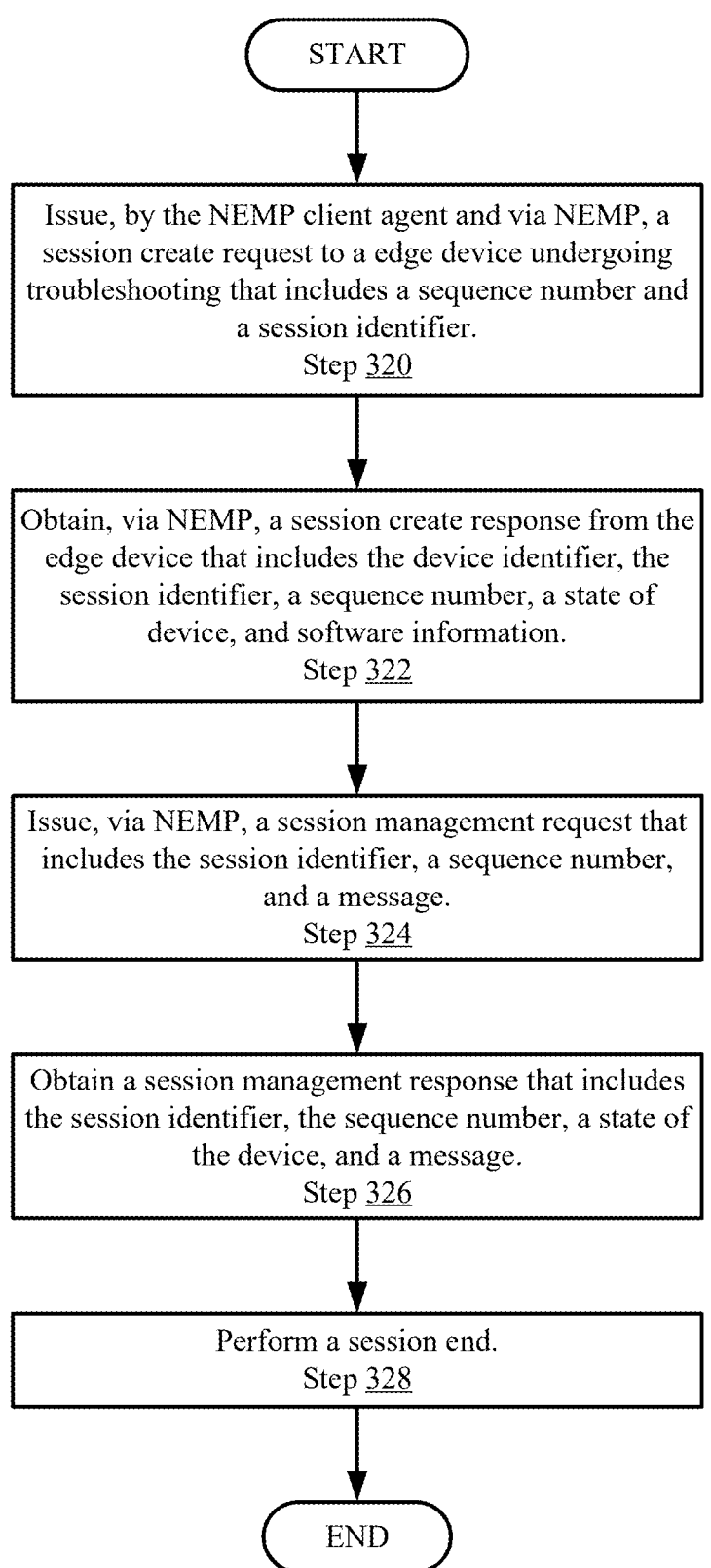
FIG. 3B shows a flowchart for session management for an edge device undergoing troubleshooting in accordance with one or more embodiments of the invention.

FIG. 3B shows a flowchart for session management for an edge device undergoing troubleshooting in accordance with one or more embodiments of the invention. The method shown in FIG. 3B may be performed by, for example, a client device (100). Other components of the system illustrated in FIG. 1 may perform the method of FIG. 3B without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

Turning to FIG. 3B, in step 320, a session create request is issued. In one or more embodiments, the session create request includes a message that indicates the request for initiating a session. The message may further specify the session being associated with troubleshooting the edge device. The session create request may be issued as a L2 data packet that includes a NEMP PDU. The NEMP PDU may include a generated sequence number and a session identifier corresponding to the troubleshooting session.

In step 322, a session create response is obtained. The session create response may be obtained as a NEMP PDU of a L2 data packet formatted in accordance with the NEMP. The session create response may include the session identifier, the device identifier, a state of the edge device, a device identifier of the edge device, the sequence number of the session create request, and any information of the edge device (software information such as OS details, firmware version, current or factory settings, etc.) relevant for the session of FIG. 3B.

In step 324, a session management request is issued. The session management request may be issued as a NEMP PDU of a L2 data packet formatted in accordance with the NEMP. The session management request includes the session identifier, a new generated sequence number, and a corresponding message formatted in the TLV format.

In step 326, a session management response is obtained. The session management response may be obtained as a NEMP PDU of a L2 data packet formatted in accordance with the NEMP. The session management response may include the session identifier, the corresponding sequence number of the session management request, a state of the device, and the corresponding message formatted in the TLV format.

In one or more embodiments, the session of troubleshooting the edge device may include additional pairs of session management requests and session management responses. Any number of additional session management requests and responses may be issued and/or received for the session without departing from the invention.

In step 328, a session end is performed. In one or more embodiments, the session end includes issuing, by either the client device or the edge device, a message for ending the session. The issued message may be obtained as a NEMP PDU of a L2 data packet formatted in accordance with the NEMP. The receiving entity may respond indicating accepting the end of the session.

Figure 3C:
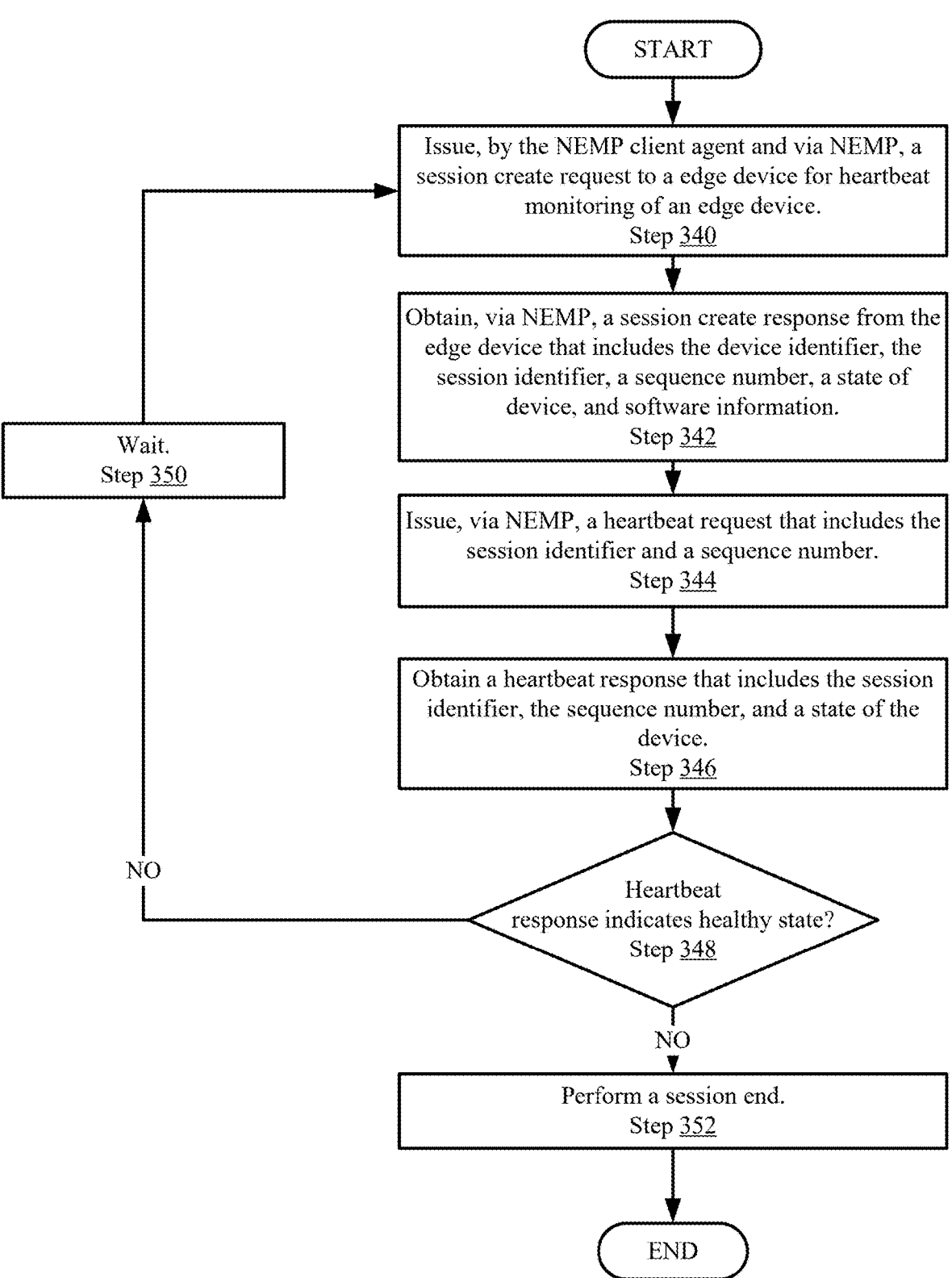
FIG. 3C shows a flowchart for session management for an edge device undergoing heartbeat monitoring in accordance with one or more embodiments of the invention.

FIG. 3C shows a flowchart for session management for an edge device undergoing troubleshooting in accordance with one or more embodiments of the invention. The method shown in FIG. 3C may be performed by, for example, a client device (100). Other components of the system illustrated in FIG. 1 may perform the method of FIG. 3C without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

Turning to FIG. 3C, in step 340, a session create request is issued. In one or more embodiments, the session create request includes a message that indicates the request for initiating a session. The message may further specify the session being associated with performing a heartbeat mechanism on the edge device. The session create request may be issued as a L2 data packet that includes a NEMP PDU. The NEMP PDU may include a generated sequence number and a session identifier corresponding to the session.

In step 342, a session create response is obtained. The session create response may be obtained as a NEMP PDU of a L2 data packet formatted in accordance with the NEMP. The session create response may include the session identifier, the device identifier, a state of the edge device, a device identifier of the edge device, the sequence number of the session create request, and any information of the edge device (software information such as OS details, firmware version, current or factory settings, etc.) relevant for the session of FIG. 3C.

In step 344, a heartbeat request is issued. The heartbeat request may be issued as a NEMP PDU of a L2 data packet formatted in accordance with the NEMP. The heartbeat request includes the session identifier, a new generated sequence number, and a corresponding message formatted in the TLV format.

In step 346, a heartbeat response is obtained. The heartbeat response may be obtained as a NEMP PDU of a L2 data packet formatted in accordance with the NEMP. The session management response may include the session identifier, the corresponding sequence number of the session management request, a state of the device, and the corresponding message formatted in the TLV format. The heartbeat response may be expected within a specified time period by the client device. Further, the heartbeat response may further specify a health of the edge device. The specified health and whether the heartbeat response is received within the specified time period are factors used by the client device to determine whether the heartbeat response indicates a healthy state of the edge device.

In step 348, a determination is made about whether the heartbeat response indicates a healthy state. If the heartbeat response does indicate a healthy state, the method proceeds to step 350, where the client device waits for a predefined period of time for the heartbeat monitoring before returning to step 340; otherwise, the method proceeds to step 352.

In step 352, a session end is performed. In one or more embodiments, the session end includes issuing, by either the client device or the edge device, a message for ending the session. The issued message may be obtained as a NEMP PDU of a L2 data packet formatted in accordance with the NEMP. The receiving entity may respond indicating accepting the end of the session.

In one or more embodiments, prior to the session end or after the session end, the client device may initiate another session to troubleshoot the edge device. The troubleshooting may be performed in accordance with, for example, FIG. 3B.

FIG. 3D shows a flowchart for session management for an edge device undergoing troubleshooting in accordance with one or more embodiments of the invention. The method shown in FIG. 3D may be performed by, for example, a client device (100). Other components of the system illustrated in FIG. 1 may perform the method of FIG. 3D without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

Turning to FIG. 3D, in step 360, a session create request is issued. In one or more embodiments, the session create request includes a message that indicates the request for initiating a session. The message may further specify the session being associated with obtaining data from the edge device. The session create request may be issued as a L2 data packet that includes a NEMP PDU. The NEMP PDU may include a generated sequence number and a session identifier corresponding to the data transmission session.

In step 362, a session create response is obtained. The session create response may be obtained as a NEMP PDU of a L2 data packet formatted in accordance with the NEMP. The session create response may include the session identifier, the device identifier, a state of the edge device, a device identifier of the edge device, the sequence number of the session create request, and any information of the edge device (software information such as OS details, firmware version, current or factory settings, etc.) relevant for the session of FIG. 3D.

In step 364, a session management request is issued. The session management request may be issued as a NEMP PDU of a L2 data packet formatted in accordance with the NEMP. The session management request includes the session identifier, a new generated sequence number, and a corresponding message formatted in the TLV format. The session management request specifies the transmission of data from the edge device.

In step 366, one or more session management response are obtained. Each session management response may be obtained as a NEMP PDU of a L2 data packet formatted in accordance with the NEMP. Each session management response may include the session identifier, the corresponding sequence number of the session management request, a state of the device, and the corresponding message formatted in the TLV format. Each corresponding message includes at least a portion of the data to be transmitted.

In one or more embodiments, the session management responses may be transmitted as blocks. Each block may include any number of responses. Each block may be issued at one time, or within the same time period.

In step 368, data retransmission for any missing or otherwise unobtained session management responses is performed. In one or more embodiments, the data retransmission may be issued as session management responses after, before, and/or during the transmission of the session management responses of step 366.

In step 370, a session end is performed. In one or more embodiments, the session end includes issuing, by either the client device or the edge device, a message for ending the session. The issued message may be obtained as a NEMP PDU of a L2 data packet formatted in accordance with the NEMP. The receiving entity may respond indicating accepting the end of the session.

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD)

drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention provide a layer 2 communication mechanism for session management between a client device and an edge device regardless of whether the edge device has been registered with a layer 3 (e.g., IP) address. Embodiments of the invention enable sessions such as troubleshooting issues in the edge devices, transmission of high volume data, heartbeat mechanisms, and/or other types of sessions without requiring layer 3 communication. In scenarios in which the edge device is unprovisioned (e.g., not registered with the system in which the client device operates), layer 3 communication may not be available for such sessions. Accordingly, providing a protocol that operates in layer 2 communication for the aforementioned sessions to a system including the unprovisioned edge devices and a service console of a client device is beneficial.

Thus, embodiments of the invention may address the problem of inefficient use of computing resources. This problem arises due to the technological nature of the environment in which file systems are utilized.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for session management, the method comprising:

issuing, by a client device and via a native edge management protocol (NEMP) protocol data unit (PDU), a session create request to an edge device, wherein the NEMP PDU is a portion of a L2 data packet, and wherein the session create request comprises a session identifier;

obtaining, via the NEMP, a session create response from the edge device, wherein the session create response comprises the session identifier, a state of the edge device, and software information;

executing a session, via the NEMP, using the session identifier, the state of the edge device, and the software information; and performing, after the executing and via the NEMP, a session end.

2. The method of claim 1, wherein the NEMP PDU comprises: a version of the NEMP, a time to live (TTL) type, a TTL value, a check sum, the session identifier, a sequence number, and a message, wherein the message is in a type, length, and value (TLV) format.

3. The method of claim 1, wherein executing the session comprises:

issuing, by the client device and via the NEMP, a session management request, wherein the session management request indicates troubleshooting the edge device; and obtaining, from the edge device and via the NEMP, a session management response, wherein the session management response comprises a device identifier, the session identifier, and a message associated with the troubleshooting.

4. The method of claim 1, wherein executing the session comprises:

issuing, by the client device and via the NEMP, a session management request, wherein the session management request indicates a high volume of data transmission from the edge device to the client device; and obtaining, from the edge device and via the NEMP, a plurality of session management responses, wherein each of the plurality of session management responses comprises a device identifier, the session identifier, and a message associated with the high volume of data transmission.

5. The method of claim 1, wherein executing the session comprises:

issuing, by the client device and via the NEMP, a heartbeat request, wherein the heartbeat request indicates a heartbeat monitoring, and wherein the heartbeat request comprises the session identifier; and obtaining, from the edge device and via the NEMP, a heartbeat response, wherein the heartbeat response comprises the session identifier and a second state of the edge device, wherein the second state of the edge device is based on a second point in time after a first point in time of the state of the edge device.

6. The method of claim 1, further comprising:

prior to issuing the session create request, performing device discovery of the edge device via the NEMP, wherein the edge device is unprovisioned prior to performing the device discovery, and wherein the session create request specifies obtaining a device identifier and operating system details from the edge device;

obtaining, via the NEMP, the device identifier and operating system details from the edge device;

performing, via the NEMP, an authentication mechanism with the edge device using the device identifier and the operating system details; and based on the authentication mechanism, enabling session creation with the edge device by the client device.

7. The method of claim 1, wherein the session end is initiated by the client device.

8. The method of claim 1, wherein the session end is initiated by the edge device.

9. A system, comprising:

an edge device; and a client device comprising a processor and memory comprising instructions, which when executed by the processor, cause the processor to perform a method, the method comprising:

issuing, via a native edge management protocol (NEMP) protocol data unit (PDU), a session create request to an edge device, wherein the session create request is transmitted using layer 2 (L2) communication, wherein the NEMP PDU is a portion of a L2 data packet, and wherein the session create request comprises a session identifier;

obtaining, via the NEMP, a session create response from the edge device, wherein the session create response comprises the session identifier, a state of the edge device, and software information;

executing a session, via the NEMP, using the session identifier, the state of the edge device, and the software information; and performing, after the executing and via the NEMP, a session end.

10. The system of claim 9, wherein the NEMP PDU comprises: a version of the NEMP, a time to live (TTL) type, a TTL value, a check sum, the session identifier, a sequence number, and a message, wherein the message is in a type, length, and value (TLV) format.

11. The system of claim 9, wherein executing the session comprises:

issuing, by the client device and via the NEMP, a session management request, wherein the session management request indicates troubleshooting the edge device; and obtaining, from the edge device and via the NEMP, a session management response, wherein the session management response comprises a device identifier, the session identifier, and a message associated with the troubleshooting.

12. The system of claim 9, wherein executing the session comprises:

issuing, by the client device and via the NEMP, a session management request, wherein the session management request indicates a high volume of data transmission from the edge device to the client device; and obtaining, from the edge device and via the NEMP, a plurality of session management responses, wherein each of the plurality of session management responses comprises a device identifier, the session identifier, and a message associated with the high volume of data transmission.

13. The system of claim 9, wherein executing the session comprises:
   issuing, by the client device and via the NEMP, a heartbeat request, wherein the heartbeat request indicates a heartbeat monitoring, wherein the heartbeat request comprises the session identifier; and
   obtaining, from the edge device and via the NEMP, a heartbeat response, wherein the heartbeat response comprises the session identifier and a second state of the edge device, wherein the second state of the edge device is based on a second point in time after a first point in time of the state of the edge device.

14. The system of claim 9, further comprising:
   prior to issuing the session create request, performing device discovery on the edge device via the NEMP,
      wherein the edge device is unprovisioned prior to performing the device discovery, and
      wherein the session create request specifies obtaining a device identifier, and operating system details from the edge device, and
      wherein performing the device discovery comprises obtaining, via the NEMP, the device identifier and operating system details from the edge device;
   performing, via the NEMP, an authentication mechanism with the edge device using the device identifier and the operating system details; and
   based on the authentication mechanism, enabling session creation with the edge device by the client device.

15. The system of claim 14, further comprising:
   a plurality of edge devices comprising at least the edge device; and
   a network device providing operative connection between the client device and each of the plurality of edge devices,
   wherein the device discovery and authentication mechanism are performed on each of the plurality of edge devices via the NEMP.

16. A non-transitory computer readable medium comprising computer readable program code, which when executed by a computer processor enables the computer processor to perform a method for managing data access, the method comprising:
   issuing, by a client device and via a native edge management protocol (NEMP) protocol data unit (PDU), a session create request to an edge device,
      wherein the NEMP PDU comprises: a version of the NEMP, a time to live (TTL) type, a TTL value, a check sum, a session identifier, a sequence number, and a message,
      wherein the message is in a type, length, and value (TLV) format,
      wherein the NEMP PDU is a portion of a L2 data packet, and
      wherein the session create request comprises the session identifier;
   obtaining, via the NEMP, a session create response from the edge device, wherein the session create response comprises the session identifier, a state of the edge device, and software information;
   executing a session, via the NEMP, using the session identifier, the state of the edge device, and the software information; and
   performing, after the executing and via the NEMP, a session end.

17. The non-transitory computer readable medium of claim 16, wherein executing the session comprises:
   issuing, by the client device and via the NEMP, a session management request, wherein the session management request indicates troubleshooting the edge device; and
   obtaining, from the edge device and via the NEMP, a session management response, wherein the session management response comprises a device identifier, the session identifier, and a message associated with the troubleshooting.

18. The non-transitory computer readable medium of claim 16, wherein executing the session comprises:
   issuing, by the client device and via the NEMP, a session management request, wherein the session management request indicates a high volume of data transmission from the edge device to the client device; and
   obtaining, from the edge device and via the NEMP, a plurality of session management responses, wherein each of the plurality of session management responses comprises a device identifier, the session identifier, and a message associated with the high volume of data transmission.

19. The non-transitory computer readable medium of claim 16, wherein executing the session comprises:
   issuing, by the client device and via the NEMP, a heartbeat request, wherein the heartbeat request indicates a heartbeat monitoring, wherein the heartbeat request comprises the session identifier; and
   obtaining, from the edge device and via the NEMP, a heartbeat response, wherein the heartbeat response comprises the session identifier and a second state of the edge device, wherein the second state of the edge device is based on a second point in time after a first point in time of the state of the edge device.

20. The non-transitory computer readable medium of claim 16, further comprising:
   prior to issuing the session create request, performing device discovery of the edge device via the NEMP,
      wherein the edge device is unprovisioned prior to performing the device discovery, and
      wherein the session create request specifies obtaining a device identifier, and operating system details from the edge device;
   obtaining, via the NEMP, the device identifier and operating system details from the edge device;
   performing, via the NEMP, an authentication mechanism with the edge device using the device identifier and the operating system details; and
   based on the authentication mechanism, enable session creation with the edge device by the client device.

* * * * *